United States Patent
Zhu et al.

(10) Patent No.: US 10,461,961 B2
(45) Date of Patent: Oct. 29, 2019

(54) METHOD FOR CALIBRATING THE CHANNEL STATE INFORMATION OF UPLINK AND DOWNLINK IN WIRELESS MULTI-ANTENNA SYSTEMS

(71) Applicants: Dengkui Zhu, Beijing (CN); Ping Liang, Newport Coast, CA (US)

(72) Inventors: Dengkui Zhu, Beijing (CN); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 192 days.

(21) Appl. No.: 15/742,381

(22) PCT Filed: Jul. 9, 2016

(86) PCT No.: PCT/US2016/041668
§ 371 (c)(1),
(2) Date: Jan. 5, 2018

(87) PCT Pub. No.: WO2017/011360
PCT Pub. Date: Jan. 19, 2017

(65) Prior Publication Data
US 2018/0191527 A1 Jul. 5, 2018

Related U.S. Application Data

(60) Provisional application No. 62/190,981, filed on Jul. 10, 2015.

(51) Int. Cl.
*H04L 25/02* (2006.01)
*H04L 5/00* (2006.01)
*H04B 7/06* (2006.01)

(52) U.S. Cl.
CPC ....... *H04L 25/0228* (2013.01); *H04B 7/0626* (2013.01); *H04L 5/0048* (2013.01); *H04L 5/0053* (2013.01)

(58) Field of Classification Search
CPC .......................... H04L 25/0228; H04L 5/0053
See application file for complete search history.

(56) References Cited

U.S. PATENT DOCUMENTS

| 9,917,628 | B2* | 3/2018 | Liang | H04B 7/0695 |
| 10,404,348 | B2* | 9/2019 | Yum | H04B 7/0632 |

(Continued)

FOREIGN PATENT DOCUMENTS

WO 2015095843 A1 6/2015

OTHER PUBLICATIONS

PCT/US16/41668 WO2017011360-WOSA (ISA/237) Written Opinion of the International Search Authority dated Sep. 27, 2016.

*Primary Examiner* — Parth Patel
(74) *Attorney, Agent, or Firm* — Guosheng Wang; United States Research and Patent Firm

(57) ABSTRACT

This invention presents methods for calibrating the channel state information in a multi-antenna system, especially for estimating channels transmitting in one direction using signaling transmitted in the other direction. The methods comprise transmitting a first and a second reference signal wherein one is a function of the other, and using the estimate of the channel in one direction, and the received signals from the two reference signals to obtain an estimate of the channel in the other direction between a transmitter of the multi-antenna system to an external wireless device.

2 Claims, 6 Drawing Sheets

(56) References Cited

U.S. PATENT DOCUMENTS

| | | | |
|---|---|---|---|
| 2009/0054093 A1* | 2/2009 | Kim | H04B 7/061 |
| | | | 455/500 |
| 2010/0150013 A1* | 6/2010 | Hara | H04L 25/0224 |
| | | | 370/252 |
| 2010/0323684 A1* | 12/2010 | Cai | H04B 7/2606 |
| | | | 455/422.1 |
| 2011/0058599 A1* | 3/2011 | Gaur | H04B 7/0452 |
| | | | 375/233 |
| 2012/0002743 A1* | 1/2012 | Cavalcante | H04B 7/024 |
| | | | 375/267 |
| 2014/0160957 A1* | 6/2014 | Zheng | H04W 24/02 |
| | | | 370/252 |
| 2014/0269502 A1* | 9/2014 | Forenza | H04B 17/12 |
| | | | 370/328 |
| 2016/0359538 A1* | 12/2016 | Onggosanusi | H04B 7/0469 |
| 2017/0012349 A1* | 1/2017 | Lee | H04B 17/21 |
| 2017/0126295 A1* | 5/2017 | Wu | H04B 7/0452 |
| 2017/0244513 A1* | 8/2017 | Pitakdumrongkija | |
| | | | H04B 7/0452 |
| 2017/0250740 A1* | 8/2017 | Liang | H04B 7/0452 |
| 2017/0250781 A1* | 8/2017 | Golitschek Edler Von Elbwart | H04L 5/005 |
| 2017/0279505 A1* | 9/2017 | Zhang | H04B 7/26 |
| 2017/0311321 A1* | 10/2017 | Kakishima | H04W 16/28 |
| 2018/0069612 A1* | 3/2018 | Yum | H04L 1/00 |
| 2018/0076881 A1* | 3/2018 | Zhu | H04B 7/204 |
| 2018/0191527 A1* | 7/2018 | Zhu | H04L 5/0048 |
| 2018/0212711 A1* | 7/2018 | Zhu | H04L 5/0048 |
| 2018/0227952 A1* | 8/2018 | Kim | H04W 74/0816 |

* cited by examiner

METHOD FOR CALIBRATING THE CHANNEL STATE INFORMATION OF UPLINK AND DOWNLINK IN WIRELESS MULTI-ANTENNA SYSTEMS

This application claims the benefit of U.S. Provisional Application No. 62/190,981, filed on Jul. 10, 2015.

FIELD OF THE INVENTION

The field of this invention relates to multi-antenna wireless communication systems.

This invention relates generally to Multiple-Input Multiple-Output (MIMO) wireless communication networks or systems, and more particularly, a novel method to calibrate the Uplink (UL) and Downlink (DL) Channel State Information (CSI) as well as the apparatus and systems to implement this method.

BACKGROUND

Massive MIMO multi-user beamforming provides the potential to significantly increase the spectral efficiency and throughput by many folds through spatial multiplexing, offering linear capacity growth without the need of increasing the spectral bandwidth. However, when the number of Radio Frequency (RF) chains and antennas becomes large, the overhead in channel estimation to obtain the CSI is significant. Note that it is understood that an antenna or an array of antenna elements is associated with an RF chain, transmitting or receiving, thus, hereafter when the number of antennas is used, it should be understood to indicate the number of antennas and the associated RF chains where each antenna is assumed to be associated with an RF chain. For a Base Station (BS) with a large number of antennas, e.g., M=512 antennas, to simultaneously serve multiple receivers on the same time-frequency resource in the DL, e.g., K=32 User Equipments (UEs) and/or Small Cells (SCs) which depend on a BS to provide wireless backhaul, the BS transmitters must know the CSI of the M×K channel matrix, where M>>K. To be precise, it is the CSI between M BS antennas and the total number of antennas on the K UEs and/or SCs. To simplify discussion, without loss of generality, the total number of UE and/or SC antennas is assumed to be K.

In massive MIMO systems, it is not efficient to obtain the DL CSI directly by sending reference pilots in the DL and feeding them back because of the two following reasons. The first reason is that the large number of antennas on the BS would cause large system overhead for reference signals in the DL. In addition, a large number of bits is needed to quantize the CSI accurately, which would cause infeasible overload of the feedback channel in the UL. Fortunately, the reciprocal property of an over-the-air wireless channel, such as in a Time-Division Duplex (TDD) system or in a Frequency-Division Duplex (FDD) system using switching to create channel reciprocity as described in our patent application PCT/US2014/071752, can be employed to reduce the channel estimation overhead. In this method, each UE and/or SC sends the Sounding Reference Signal (SRS) or pilot signal with a unique sequence in the UL specified resource then the BS estimates the CSI between each pair of transmitting and receiving antennas at the baseband. In FIG. 1, the components of the UL CSI and the DL CSI of a Multi-User MIMO (MU-MIMO) communication system are presented, where the BS 1 is consisted with a baseband processor 2, M RF transmitters 3, M RF receivers 4, and M antennas 5, while each UE 6 is consisted with a baseband processor 2, an RF transmitter 3, an RF receiver 4, and an antenna 5. The BS with M antennas serves K UEs on the same-time resource through the over-the-air channel 7. The responses of the mth BS RF transmitter and the mth BS RF receiver are denoted by $t_m^{BS}$ and $r_m^{BS}$ respectively, where m=1, ..., M. The responses of the RF transmitter and the RF receiver on the kth UE are denoted by $t_k^{UE}$ and $r_k^{UE}$ respectively, k=1, ..., K. The over-the-air channel between the mth BS antenna and the kth UE is denoted as $h_{m,k}^{air}$. Hence, as shown in FIG. 1, the CSI measured by the BS actually consists of responses of three components. i.e., the UE RF transmitter, the radio over-the-air channel, and the BS RF receiver, e.g., the measured CSI between the kth UE and the mth BS antenna is written as $h_{m,k}^{UL} = r_m^{BS} h_{m,k}^{air} t_k^{UE}$, where the UE is assumed to have a single antenna. However, although the radio over-the-air channel is reciprocal between the UL and the DL, the other two components are not reciprocal, which causes the DL CSI to be different from the measured UL CSI, i.e., $h_{m,k}^{DL} = t_m^{BS} h_{m,k}^{air} r_k^{UE} \neq h_{m,k}^{UL}$. For this reason, before the measured UL CSI is used to calculate the DL beamforming matrix or precoding matrix, some modifications or calibrations have to be done to obtain the estimated DL CSI.

The prior art to solve this problem can be classified into two types as listed below. The first one needs the UE to feed back some related information [1], e.g., the responses $t_k^{UE}$. With the feedback information and the measured parameters of the transmitters and receivers on the BS, the BS can complete the calibration. With this method, the BS could estimate the actual DL CSI up to the accuracy of the measured and feedback information. The second type only needs the BS to measure parameters of the transmitters and receivers on the BS to obtain a scaled DL CSI as in reference [2], i.e., $h_{m,k}^{DL,est} = \beta_k h_{m,k}^{DL}$, where $\beta_k$ is a complex-valued scaling factor. The first type does not only increase the complexity and cost of a UE, but also causes unnecessary feedback overhead to the networks. The second type needs the BS to measure the responses between a reference antenna and all other antennas in both directions, either over the air or using circuits, which indicates that it can only be completed offline or during idle time considering the large number of antennas. However, as the temperatures of the transmitters or receivers change and components age, the responses $t_m^{BS}$ and $r_m^{BS}$ would change. Hence, the prior methods for calibrating the UL CSI and DL CSI are either too complex or not accurate enough. For these reasons, this invention provides a novel method and apparatus designed to overcome these shortcomings.

BRIEF DESCRIPTION OF THE DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal, or a test signal.

Figure 1:
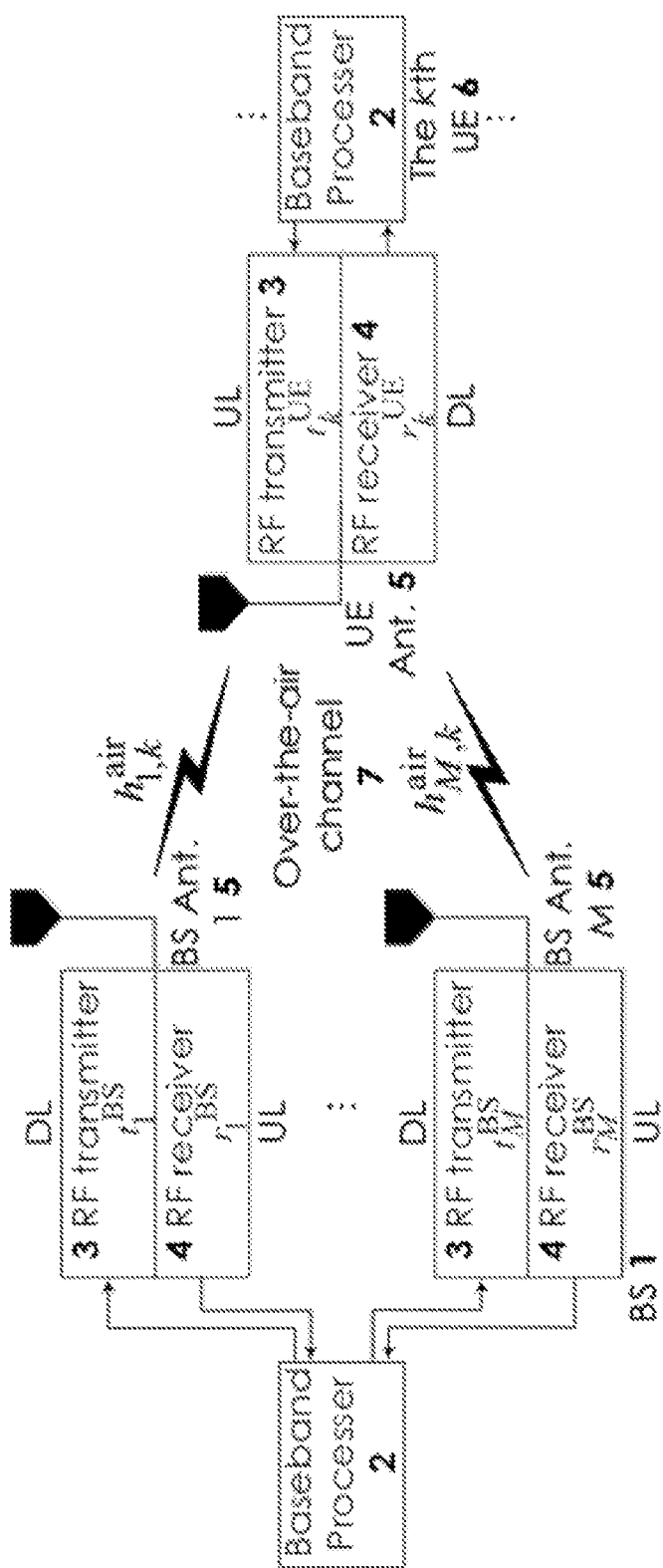
FIG. 1 shows the components of the UL CSI and DL CSI of an MU-MIMO communication system.

For a wireless communication system where the BS has multiple antennas, the UE transmits the pilot signal or SRS in the UL so that the BS can estimate the channel between each pair of transmitting and receiving antennas. In one embodiment shown in FIG. 1, where each UE has a single antenna while the BS has M antennas, the measured channel coefficient or CSI between the mth receiving antenna and the kth UE is written as $$h_{m,k}^{UL} = r_m^{BS} h_{m,k}^{air} t_k^{UE}, m=1, \ldots, M, k=1, \ldots, K, \quad (1)$$

where $r_m^{BS}$ and $t_k^{UE}$ denote the transfer functions of the mth BS receiver and the transmitter on the kth UE, while $h_{m,k}^{air}$ denotes the radio over-the-air channel. Note that (1) can be extended directly to the case where each UE has multiple antennas, e.g., each antenna can be considered as a different UE. Hence, the assumption of single-antenna UEs in the following descriptions and embodiments does not affect the generality of the embodiments of this invention.

With the measured UL CSI $h_{m,k}^{UL}$, the DL CSI is written as $$h_{m,k}^{DL} = t_m^{BS} h_{m,k}^{air} r_k^{UE} = h_{m,k}^{UL} \frac{t_m^{BS} r_k^{UE}}{r_m^{BS} t_k^{UE}} = \beta_k h_{m,k}^{UL} \frac{t_m^{BS}}{r_m^{BS}} = \beta_k h_{m,k}^{DL,equ}, \quad (2)$$

where $\beta_k = r_k^{UE}/t_k^{UE}$ is a complex-valued scaling factor, and $h_{m,k}^{DL,equ} = h_{m,k}^{UL} t_m^{BS}/r_m^{BS}$. The DL CSI $h_{m,k}^{DL}$ needs to be known with a scaling factor $\beta_k$ that depends only on the hardware parameters of the kth UE to calculate the DL beamforming or precoding matrix using the generally used Zero-Forcing (ZF) beamforming, conjugate beamforming, or other precoding methods. Since the channel vector between each UE antenna and all the BS antennas can be written as $$h_k^{DL} = \beta_k h_k^{DL,equ}, \quad (3)$$

where $h_k^{DL} = [h_{1,k}^{DL}, \ldots, h_{M,k}^{DL}]^T$ and $h_k^{DL,equ} = [h_{1,k}^{DL,equ}, \ldots, h_{M,k}^{DL,equ}]^T$, the MU-MIMO channel matrix can be denoted as $H^{DL} = [h_1^{DL}, \ldots, h_K^{DL}]$, then the corresponding matrix $H^{DL,equ}$ is $H^{DL,equ} = [h_1^{DL,equ}, \ldots, h_K^{DL,equ}]$. Hence, the precoding matrix before being normalized is $$W^{DL,equ} = [(H^{DL,equ})^H H^{DL,equ}]^{-1}(H^{DL,equ})^H = DW^{DL}, \quad (4)$$

where $W^{DL} = [(H^{DL})^H H^{DL}]^{-1}(H^{DL})^H$, $D = \mathrm{diag}(\beta_1, \ldots, \beta_K)$, and $(H^{DL,equ})^H = D(H^{DL})^H$. After normalizing the matrix $W^{DL}$ and $W^{DL,equ}$ by the transmitting power, they become the same matrix. Hence, the complex-valued scaling factor of each UE would not affect the accuracy of the DL beamforming or precoding matrix. Therefore, the BS only needs to obtain the factor or parameter $\alpha_m = t_m^{BS}/r_m^{BS}$ to calculate the DL CSI.

Firstly, a reference signal $s_0$ is transmitted by the mth transmitter, m=1, ..., M, to measure the whole channel response of the mth transmitter to the mth receiver. Instead of transmitting $s_0$ over the air through the antenna, the mth transmitter-receiver pair of the BS is connected directly so that the whole channel of the transmitter to the receiver can be estimated. However, in case that the power of the signal from the transmitter saturates the Low Noise Amplifier (LNA) or the Analog-to-Digital Converter (ADC) of the receiver due to the high gain of the Power Amplifier (PA) in the transmitter, the signal out of the transmitter needs to be first passed through an attenuator and then fed into the receiver in a TDD system. The signal out of the receiver is $$y_m = \mu_0 r_m^{BS} t_m^{BS} s_0, \quad (5)$$

where $\mu_0$ denotes the attenuating factor, which is assumed to the same for all the M antennas. Since the transmitters and receivers of the M antennas are independent, this process can be carried out simultaneously.

For FDD systems, where the frequency band $F_1$ is used for transmitting while the frequency band $F_2$ is used for receiving, the signal out of the attenuator can be passed to a mixer with the frequency shift $\Delta F = F_1 - F_2$ first. After that, the signal out of the mixer is fed into the receiver. For simplicity, $\mu_0$ is used to denote the combined response of the attenuator and the mixer in FDD systems. Hence, (5) still can be applied to FDD systems.

Next, to estimate the response of the receiver, another reference signal $s_1$, which satisfies $s_0 = s_1^2$, is passed through an independent transmitter or any one of the M transmitters with the response $t_s^{BS}$ and an attenuator in TDD systems, then the output signal $t_s^{BS} s_1$ is fed into the M receivers. Hence, the output signals of the M receivers are $$z_m = \mu_1 r_m^{BS} t_s^{BS} s_1, \quad (6)$$

where $\mu_1$ is the attenuating factor for the transmitter $t_s^{BS}$. Similarly to $\mu_0$, the factor $\mu_1$ can also be used to denote the combined response of the attenuator and the mixer in FDD systems. Hence, (6) is also applicable to FDD systems.

At the baseband, with the received signals $y_m$ and $z_m$, the BS can estimate the parameter $\alpha_m$ by $$\frac{y_m}{z_m^2} = \frac{\mu_0 r_m^{BS} t_m^{BS} s_0}{(\mu_1 r_m^{BS} t_s^{BS} s_1)^2} = \frac{t_m^{BS}}{r_m^{BS}} \frac{\mu_0}{(t_s^{BS} \mu_1)^2} = \frac{\mu_0}{(t_s^{BS} \mu_1)^2} \alpha_m. \quad (7)$$

Hence, with the measured UL CSI $h_{m,k}^{UL}$, the DL CSI is calibrated as $$h_{m,k}^{DL,Cal} = h_{m,k}^{UL} \frac{y_m}{z_m^2}, \qquad (8)$$

where the relation between $h_{m,k}^{DL,Cal}$ and the actual value $h_{m,k}^{DL}$ is $$h_{m,k}^{DL,Cal} = \frac{\mu_0}{(t_s^{BS}\mu_1)^2} h_{m,k}^{UL} \alpha_m = \frac{\mu_0}{(t_s^{BS}\mu_1)^2} \frac{1}{\beta_k} h_{m,k}^{DL} = \frac{1}{\gamma_k} h_{m,k}^{DL}, \qquad (9)$$

or equivalently, $h_{m,k}^{DL} = \gamma_k h_{m,k}^{DL,Cal}$, where $\gamma_k = \beta_k (t_s^{BS}\mu_1)^2/\mu_0$. Similarly to $\beta_k$, the factor $\gamma_k$ is a complex-valued scaling factor which does not affect the performance of the DL beamforming or precoding as shown in [0019]. At first sight, it appears that the parameters $t_s^{BS}$, $\mu_0$, and $\mu_1$, can be pre-calibrated. However, the pre-calibrations are in fact not necessary because the effect of $\gamma_k$ can be removed when conducting scaling.

Figure 2:
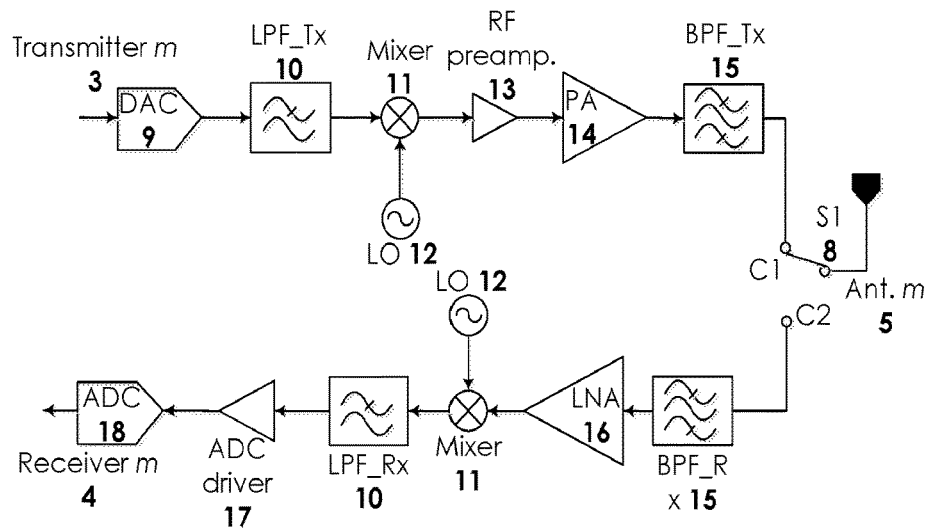
FIG. 2 shows the general principle circuit of a prior art TDD system apparatus.

FIG. 2 shows the general principle circuit of a prior art TDD apparatus that uses part of the time in a wireless radio frame for transmitting while the rest of the time of a wireless radio frame for receiving. In this figure, a switch 8 S1 is used to switch between the mth BS transmitter and the mth BS receiver, where the transmitter is consisted of a Digital-to-Analog Convertor (DAC) 9, a Low-Pass Filter (LPF) 10, a mixer 11, a Local Oscillator (LO) 12, an RF preamplifier 13, a PA 14, and a Band-Pass Filter (BPF) 15, while the receiver is consisted of a BPF 15, a LNA 16, a mixer 11, a LO 12, a LPF 10, an ADC driver 17, and an ADC 18. Note that this circuit illustrates the working principle and assumes direct conversion. A person skilled in the art understands variations can be made and further details omitted here can be added in actual implementations without changing the working principle, e.g., the locations and the numbers of PAs, LNAs, LPFs, and BPFs. For the purpose of illustration, the figure shows only one modulation path, which can be understood as a component in a quadrature modulation, e.g., an in-phase or quadrature component. It is straightforward to add the other quadrature component to the figure with a 90-degree phase shift of the LO. Furthermore, only the transmitter and the receiver of one antenna are illustrated for simplicity, i.e., the mth antenna.

Figure 3:
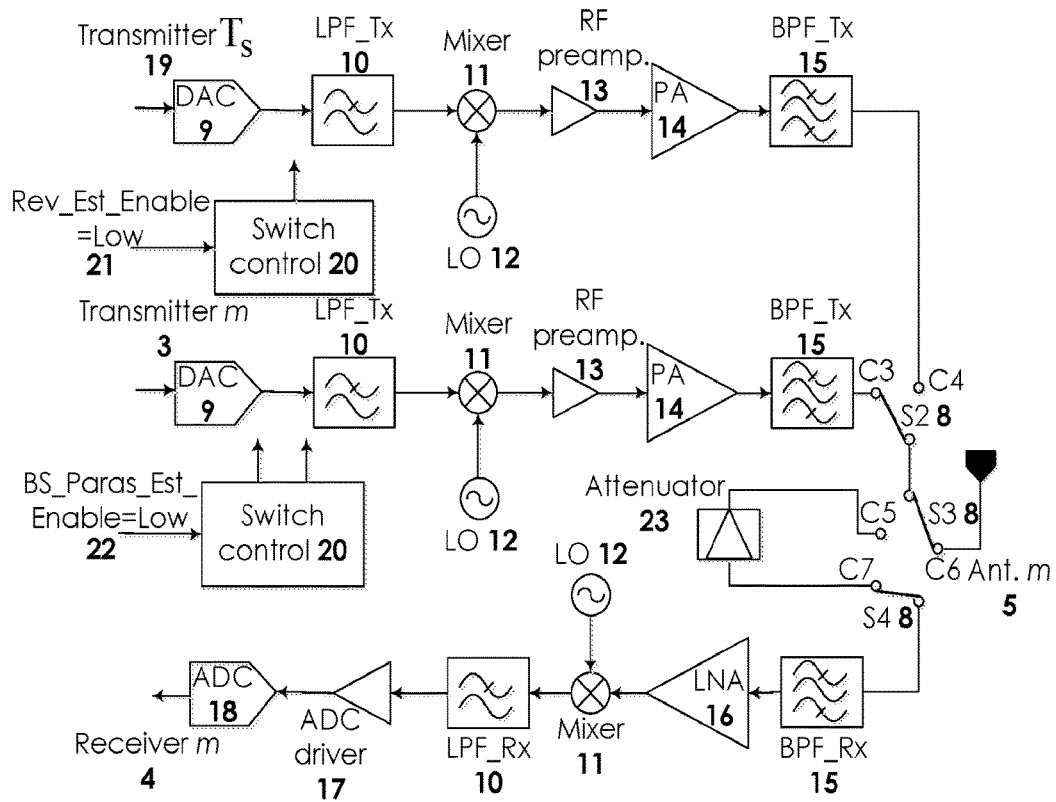
FIG. 3 shows the normal DL transmitting circuit of a TDD system in this patent.
Figure 4:
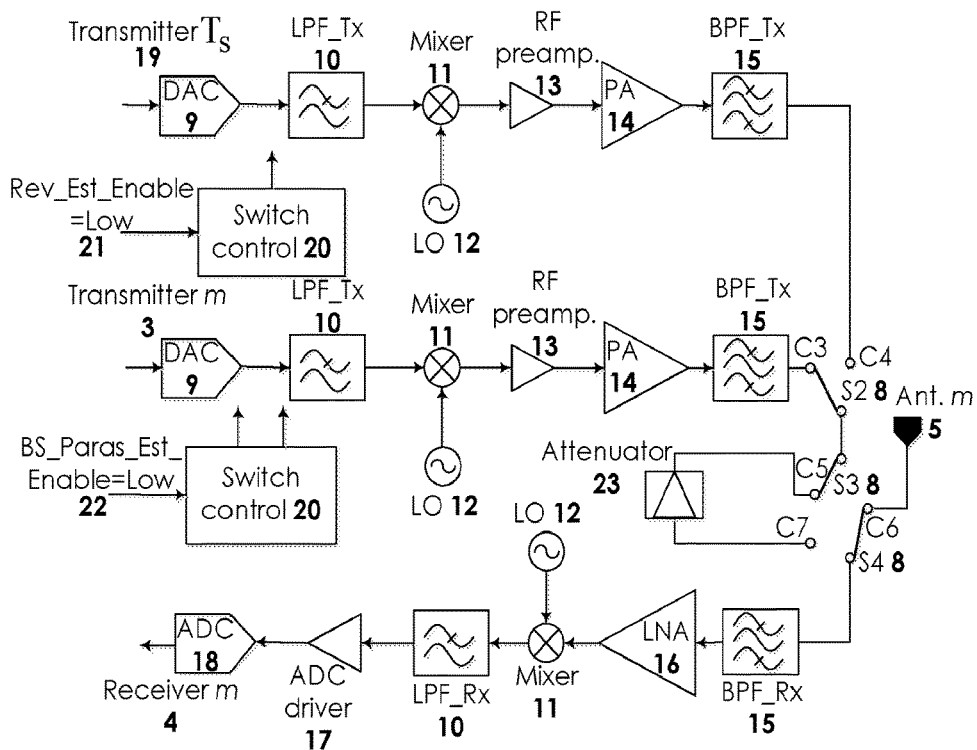
FIG. 4 shows the normal UL transmitting circuit of a TDD system in this patent.
Figure 5:
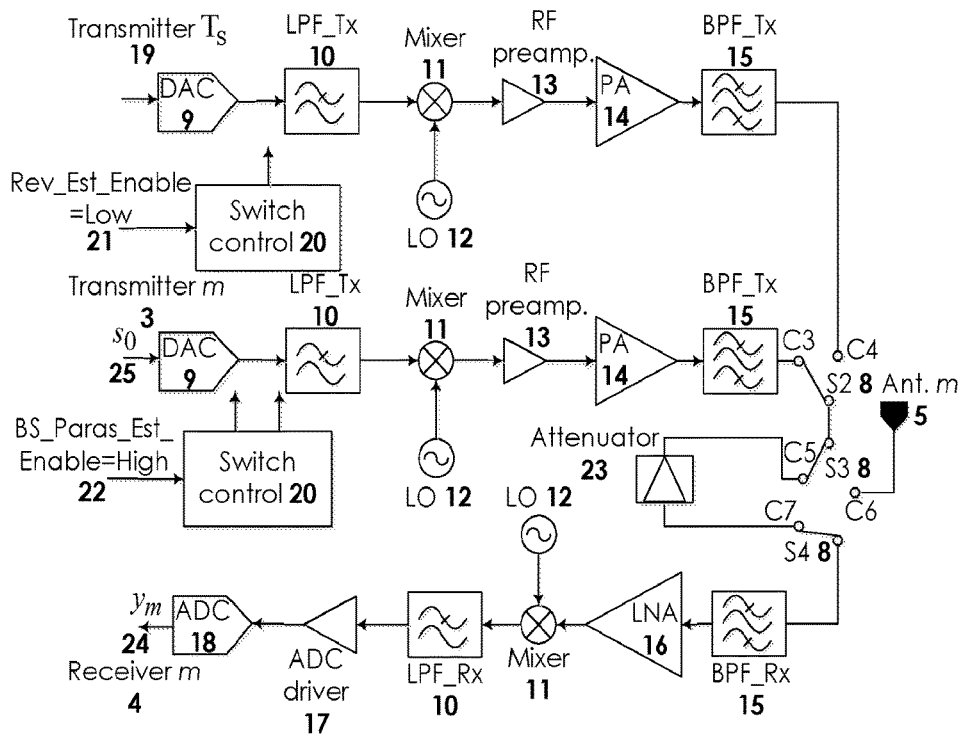
FIG. 5 shows the proposed circuit to measure the whole inner channel response of a transmitter and a receiver in a TDD system.
Figure 6:
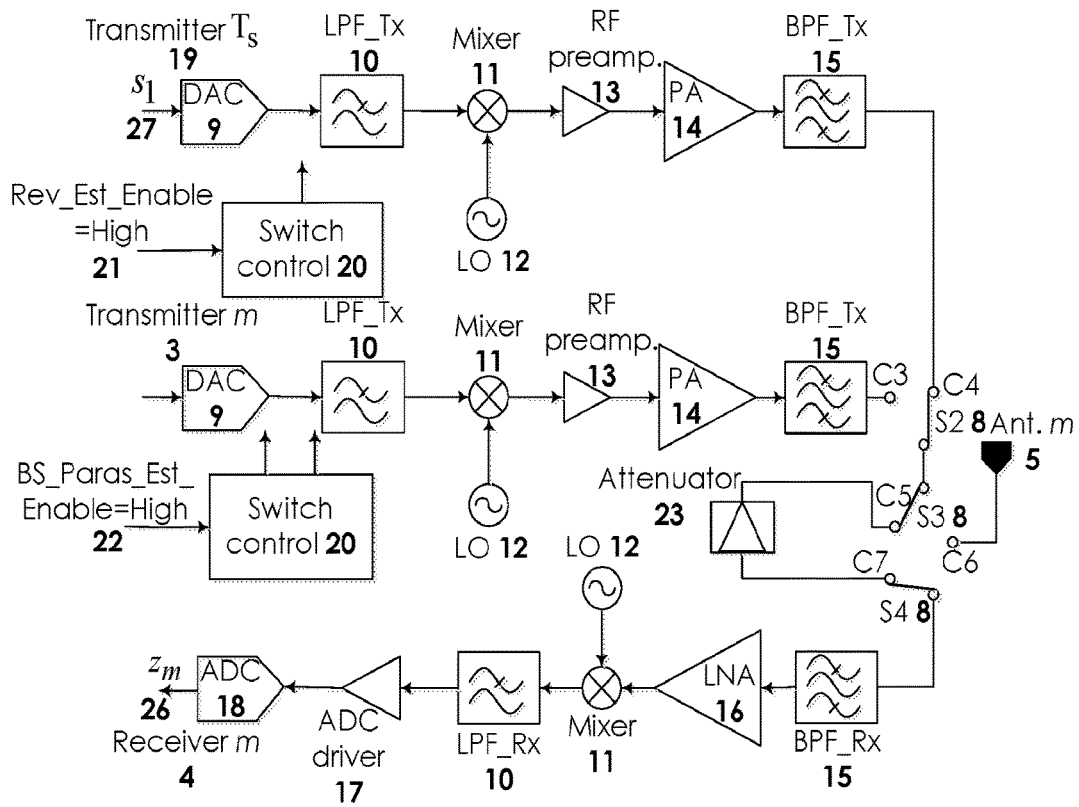
FIG. 6 shows the circuit to measure the response of a receiver in a TDD system.

One embodiment of an apparatus in a TDD system is illustrated in FIG. 3 to FIG. 6. Note that the independent transmitter $T_s$ 19 is the same for each antenna, which can be implemented by duplicating M copies of the output of $T_s$. A switch control module 20 with two control signals Rev_Est_Enable 21 and BS_Para_Est_Enable 22 is used to control the three switches 8 S2, S3, and S4. An attenuator 23 is connected to the mth receiver in the reciprocity calibration mode. FIG. 3 shows the normal DL transmitting mode while FIG. 4 shows the normal UL receiving mode in TDD systems, where the three switches are controlled by the control signals from the switch control module. When estimating the whole response of the mth transmitter and the m th receiver in FIG. 5, i.e., BS_Para_Est_Enable=High and Rev_Est_Enable=Low, the mth transmitter, the attenuator, and the mth receiver are connected, then the received signal $y_m$ 24 is obtained by passing the reference signal $s_0$ 25 through the connected inner channel of the BS. When estimating the channel response of the mth receiver in FIG. 6, i.e., BS_Para_Est_Enable=High and Rev_Est_Enable=High, the independent transmitter $T_s$, the attenuator, and the mth receiver are connected, then the received $z_m$ 26 is obtained by passing the reference signal $s_1$ 27 through the connected inner channel of the BS. With the measured $y_m$ and $z_m$, the BS can estimate or calibrate the DL CSI by (8).

In one embodiment of this patent in TDD systems, the measurements of $y_m$ and $z_m$ can be implemented in the guard period inserted at the DL-to-UL switch point of a wireless radio frame without affecting the normal DL transmission and the normal UL transmission. Hence, the method in this patent can track the response of transmitters and receivers timely and accurately so that it can reflect the temperature changes and the aging of components of the transmitters and receivers.

Figure 7:
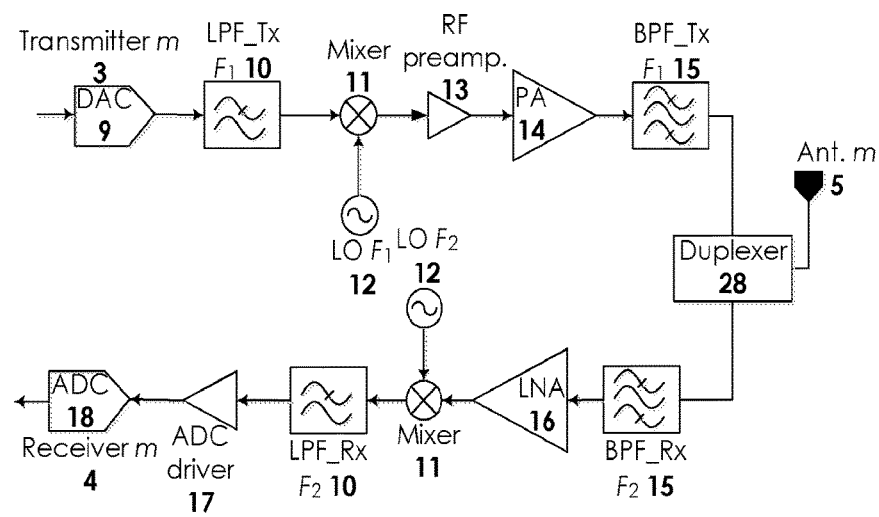
FIG. 7 shows the general principle circuit of a prior art FDD system apparatus.

FIG. 7 shows the general principle circuit of a prior art FDD apparatus that uses a first frequency band F1 for transmitting and a second frequency band F2 for receiving employing a duplexer 28. Note that this circuit illustrates the working principle and assumes direct conversion. Furthermore, the first frequency band for transmitting and the second frequency band for receiving may each comprise a set of frequency bands as used in carrier aggregation. Hereafter, for the simplicity of presentation, the description of the embodiments will use a single frequency band for each case but it can be easily generalized to each band being an aggregation of two or more carrier bands by a person skilled in the art based on the embodiments of this invention.

Figure 8:
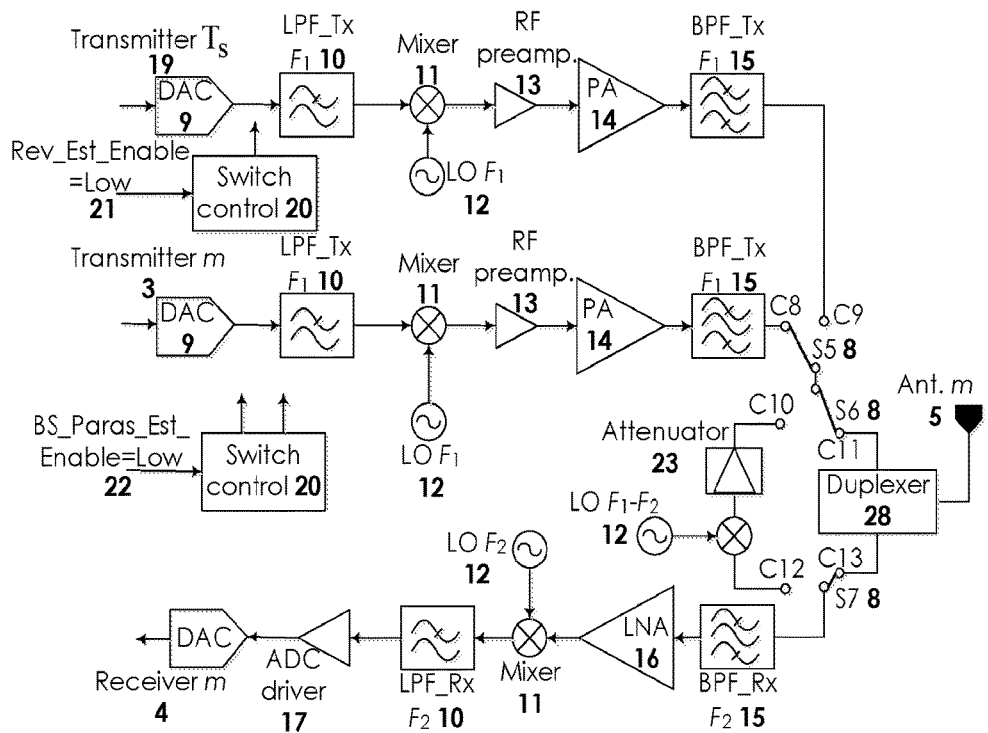
FIG. 8 shows the normal transmitting circuit of a FDD system in this patent.
Figure 9:
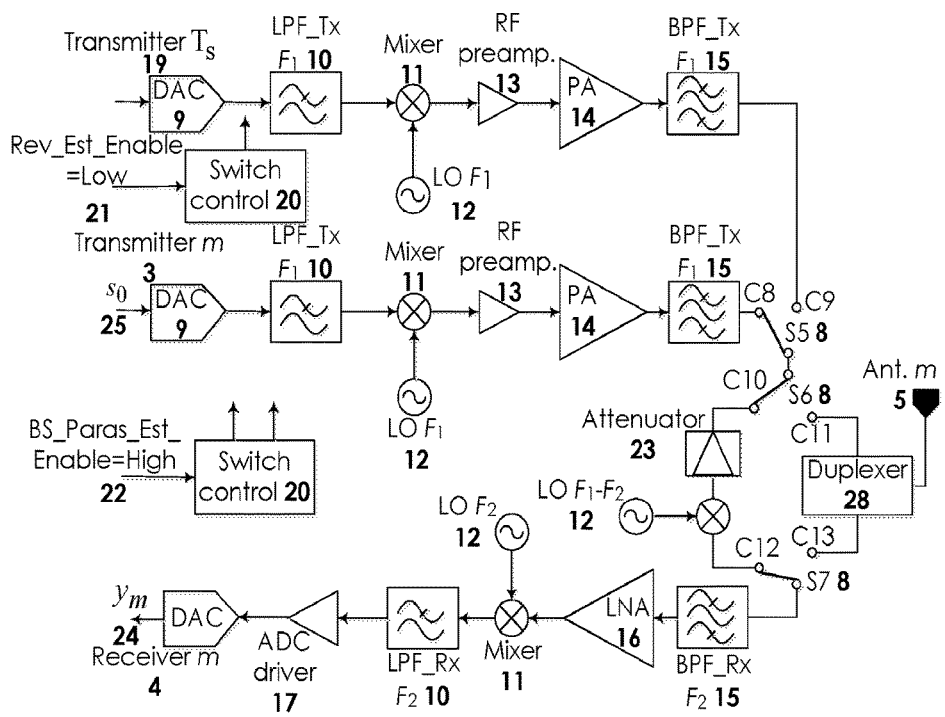
FIG. 9 shows the proposed circuit to measure the whole inner channel response of a transmitter and a receiver in a FDD system.
Figure 10:
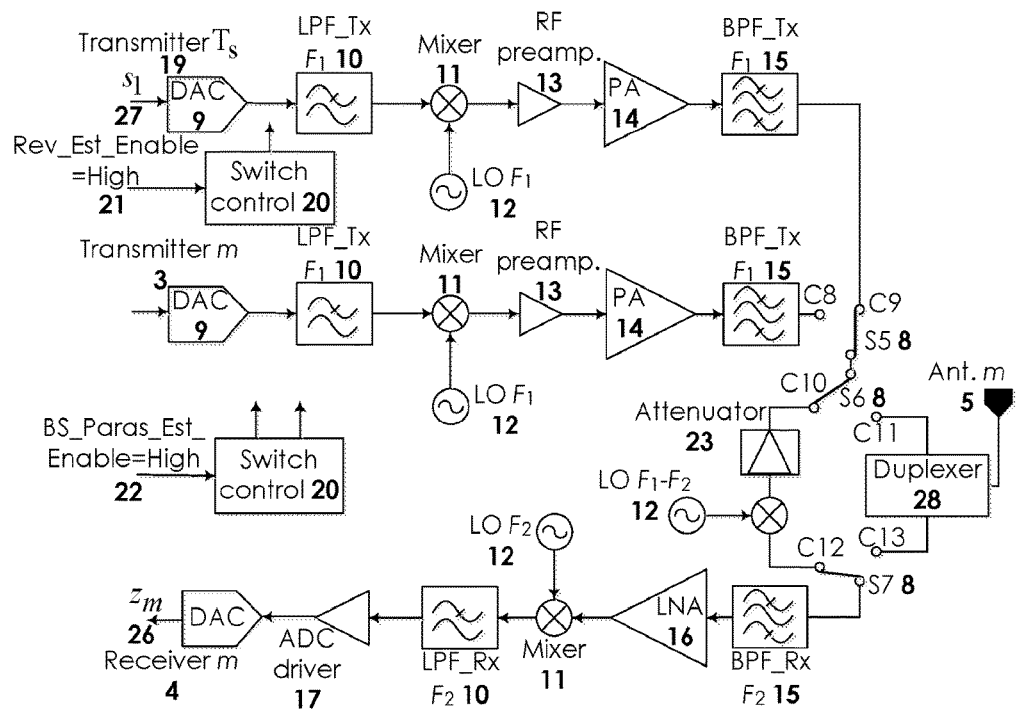
FIG. 10 shows the circuit to measure the response of a receiver in a FDD system.

As one embodiment of this patent, apparatuses that implement this patent in FDD systems are illustrated in FIG. 8, FIG. 9, and FIG. 10. Note that the independent transmitter $T_s$ 19 is the same for each antenna, which can be implemented by duplicating M copies of the output of $T_s$. A switch control module 20 with two control signals Rev_Est_Enable 21 and BS_Para_Est_Enable 22 is used to control the two switches 8 S5, S6 and S7. FIG. 8 shows the normal transmitting and receiving mode in FDD systems, where the two switches are controlled by the control signals from the switch control module. When estimating the whole response of the mth transmitter and the mth receiver in FIG. 9, i.e., BS_Para_Est_Enable=High and Rev_Est_Enable=Low, the mth transmitter, the attenuator, the mixer, and the mth receiver are connected, then the received signal $y_m$ 24 is obtained by passing the reference signal $s_0$ 25 through the connected inner channel of the BS. When estimating the channel response of the mth receiver as presented in FIG. 10, i.e., BS_Para_Est_Enable=High and Rev_Est_Enable=High, the independent transmitter $T_s$, the attenuator, the mixer, and the mth receiver are connected, then the received $z_m$ 26 is obtained by passing the reference signal $s_1$ 27 through the connected inner channel of the BS. With the measured $y_m$ and $z_m$, the BS can estimate or calibrate the DL CSI by (8).

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for calibrating the channel state information in a multi-antenna system comprising M receivers receiving a predefined signal transmitted by one or more external wireless device and producing a signal $x_m$ at the output of the mth receiver; using the received signals $x_m$ to obtain an estimate of the uplink channel $h_{m,k}^{UL}$ from the kth external wireless device to the m th receiver of the multi-antenna system; the m th transmitter transmitting a first reference signal $s_0$, m=1, ... , M, to the mth receiver to produce a signal $y_m$ at the output of the mth receiver; a transmitter transmitting a second reference signal $s_1$ to each of the M receivers to produce a signal $z_m$ at the output of the mth receiver, wherein the reference signal $s_1$ is a function of the first reference signal $s_0$; using $h_{m,k}^{UL}$, $y_m$ and $z_m$ to obtain an estimate of the downlink channel $h_{m,k}^{DL,Cal}$ from the mth transmitter of the multi-antenna system to the kth external wireless device wherein the function relating reference signal $s_1$ to reference signal $s_0$ is $s_0 = s_1^2$.

2. A method for calibrating the channel state information in a multi-antenna system comprising M receivers receiving a predefined signal transmitted by one or more external wireless device and producing a signal $x_m$ at the output of the mth receiver; using the received signals $x_m$ to obtain an estimate of the uplink channel $h_{m,k}^{UL}$ from the kth external wireless device to the m th receiver of the multi-antenna system; the m th transmitter transmitting a first reference signal $s_0$, m=1, ... , M, to the mth receiver to produce a signal $y_m$ at the output of the mth receiver; a transmitter transmitting a second reference signal $s_1$ to each of the M receivers to produce a signal $z_m$ at the output of the mth receiver, wherein the reference signal $s_1$ is a function of the first reference signal $s_0$; using $h_{m,k}^{UL}$, $y_m$ and $z_m$ to obtain an estimate of the downlink channel $h_{m,k}^{DL,Cal}$ from the mth transmitter of the multi-antenna system to the kth external wireless device wherein $$h_{m,k}^{DL,Cal} = h_{m,k}^{UL} \frac{y_m}{z_m^2}.$$

* * * * *